Figure 1:
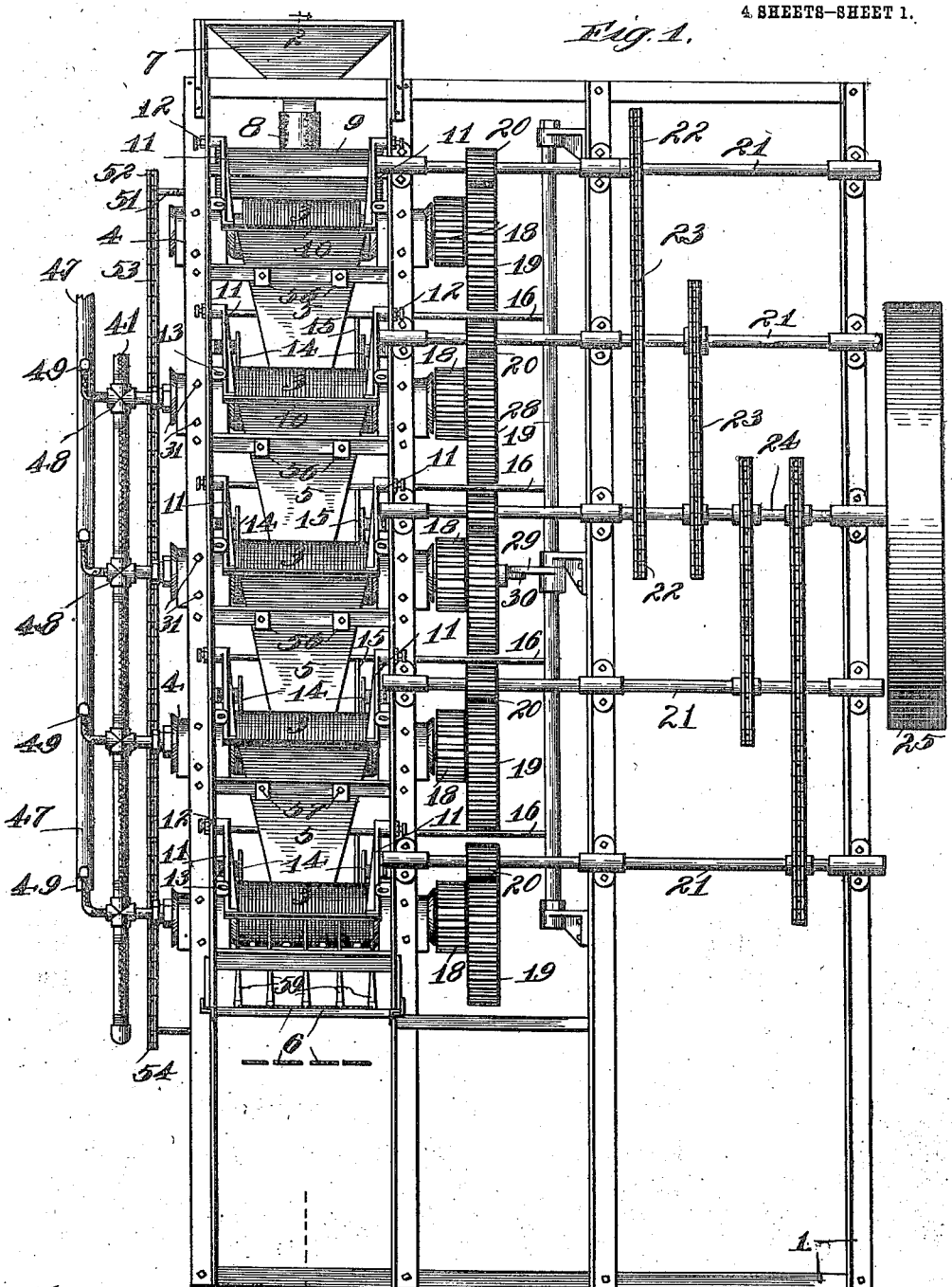

W. E. WILLIAMS.
MACHINE FOR CONVERTING FOOD MATERIALS INTO SHREDS OR FIBERS.
APPLICATION FILED OCT. 1, 1907.

1,024,168.

Patented Apr. 23, 1912.

4 SHEETS—SHEET 1.

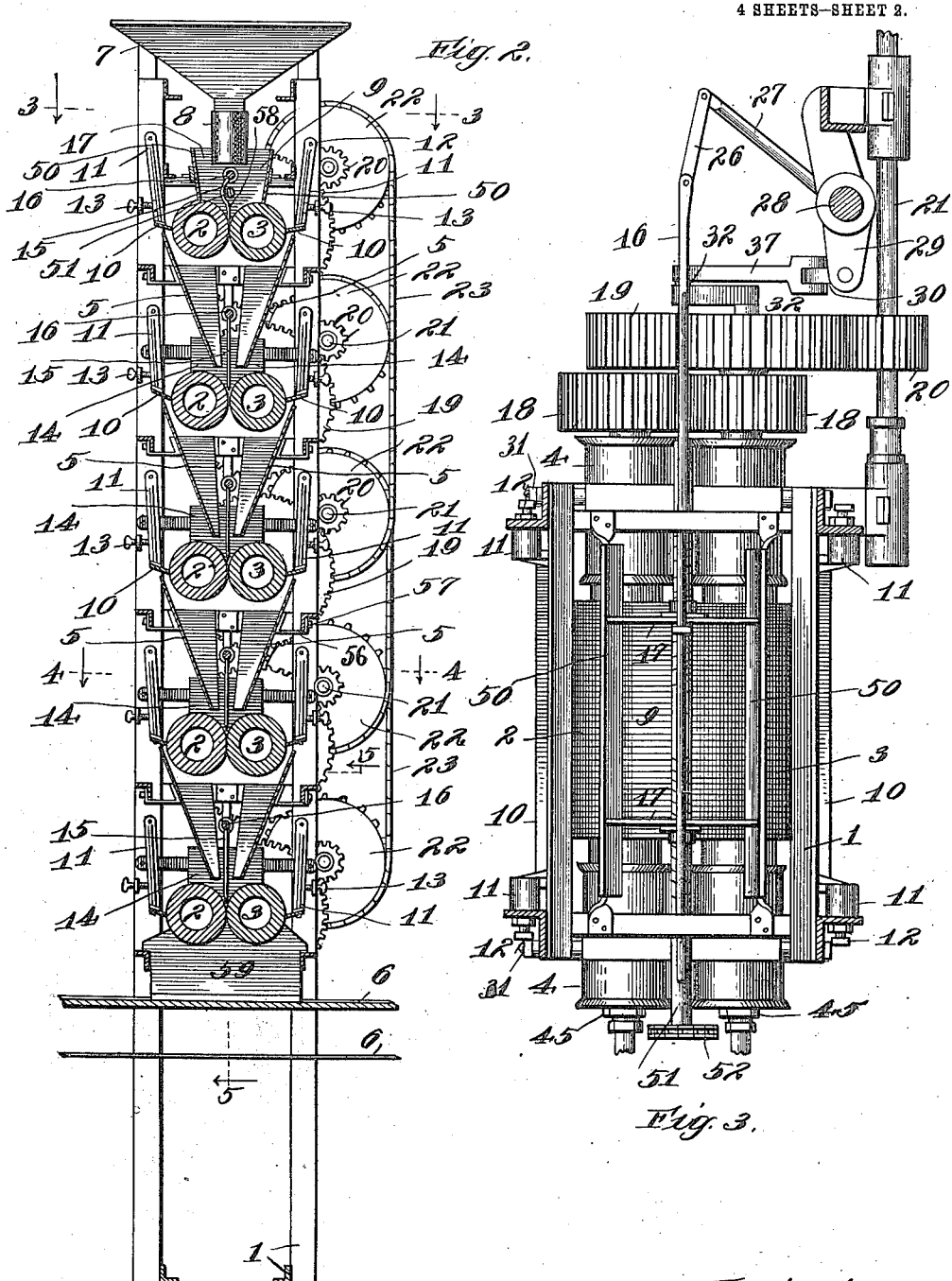

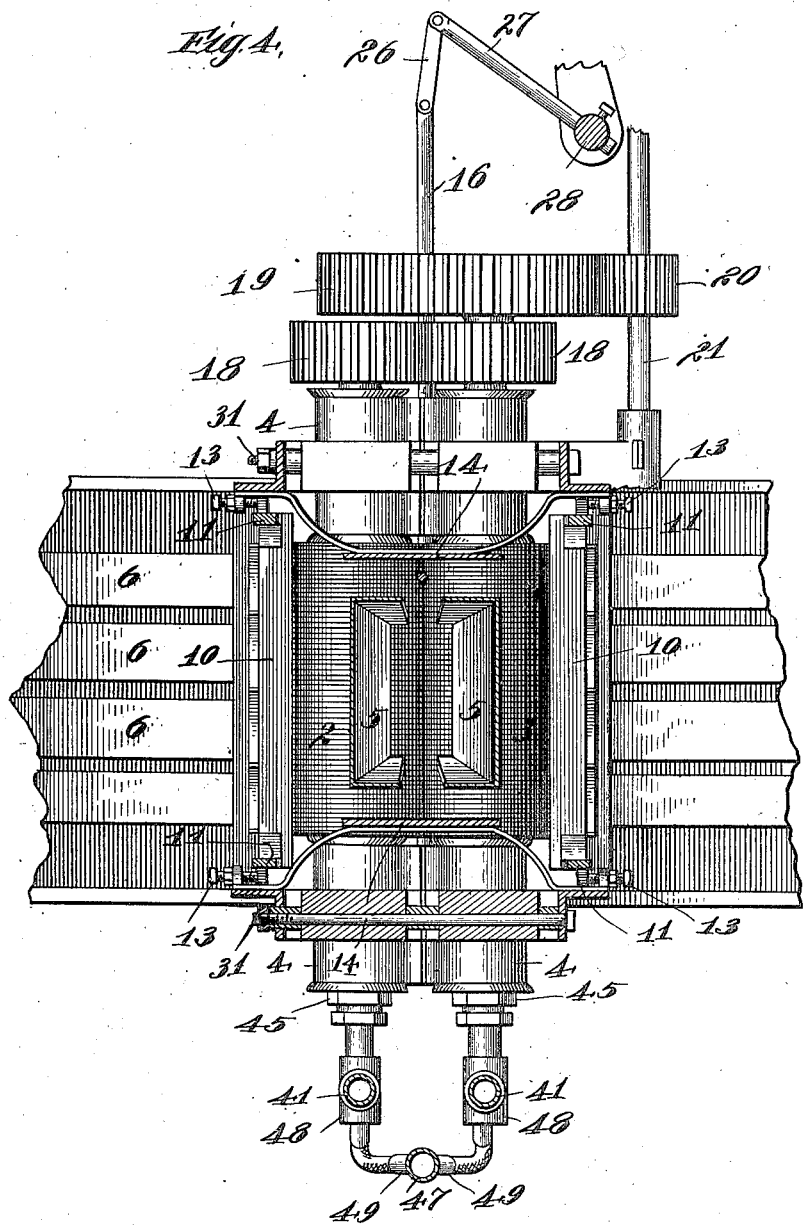

W. E. WILLIAMS.
MACHINE FOR CONVERTING FOOD MATERIALS INTO SHREDS OR FIBERS.
APPLICATION FILED OCT. 1, 1907.
1,024,168.
Patented Apr. 23, 1912.
4 SHEETS—SHEET 4.
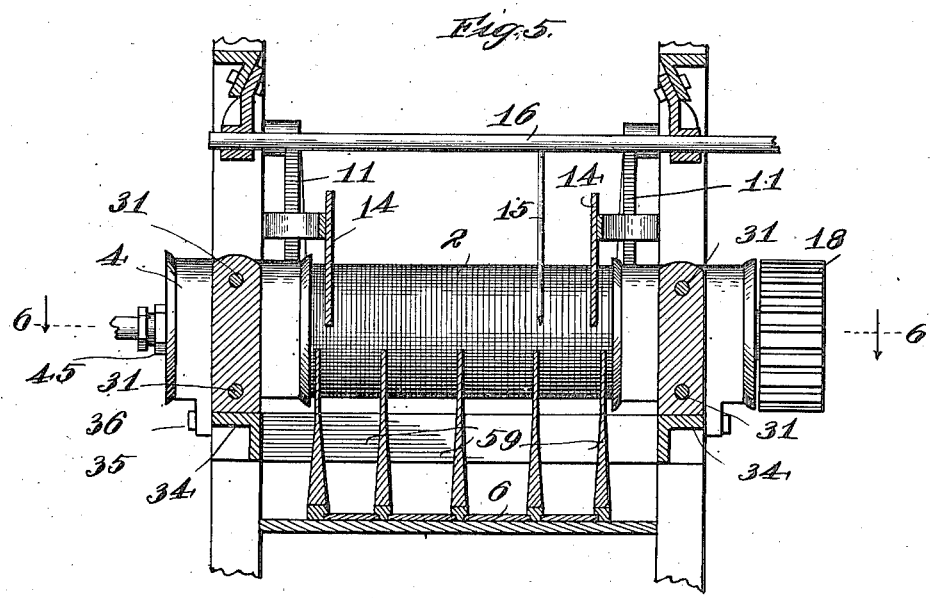
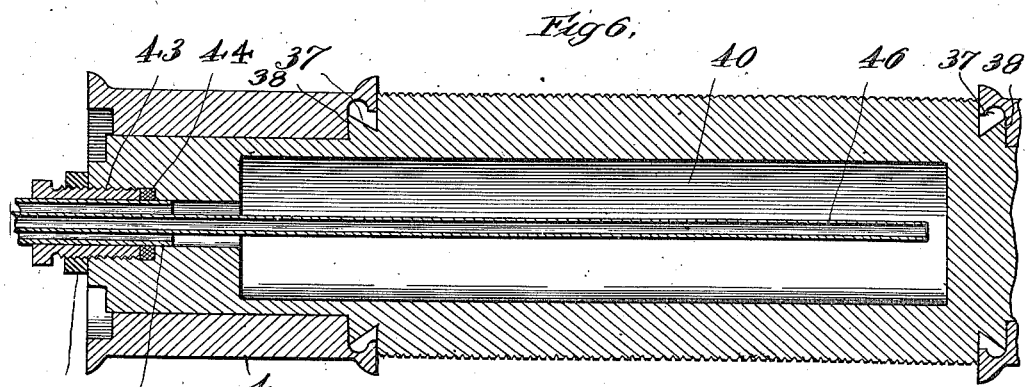
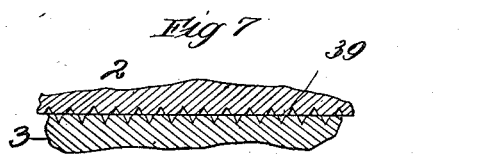
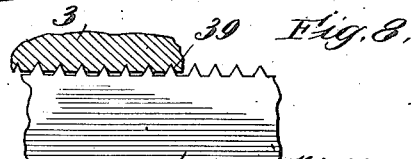
Witnesses:
Inventor:

UNITED STATES PATENT OFFICE.

WILLIAM E. WILLIAMS, OF CHICAGO, ILLINOIS.

MACHINE FOR CONVERTING FOOD MATERIALS INTO SHREDS OR FIBERS.

1,024,168.  Specification of Letters Patent.  Patented Apr. 23, 1912.

Application filed October 1, 1907. Serial No. 395,347.

*To all whom it may concern:*

Be it known that I, WILLIAM E. WILLIAMS, a citizen of the United States, residing at Chicago, in the county of Cook and State of Illinois, have invented certain new and useful Improvements in Machines for Converting Food Materials into Shreds or Fibers, of which the following is a specification, reference being had therein to the accompanying drawing.

My invention relates to machines for converting cereal grains, dough, or other suitable materials into shreds, fibers, or filaments, and the general object is to produce a filamentary product differing in character from any that have been produced by other machinery.

In the accompanying drawings, Figure 1 is a side elevation of the machine. Fig. 2 is a sectional end elevation of the same apparatus. Figs. 3, 4, 5 are sections on the lines 3—3, 4—4, 5—5, respectively, of Fig. 2. Fig. 6 is a horizontal section through a certain roll and its bearings. Fig. 7 is an enlarged sectional view showing two grooved rolls in contact. Fig. 8 is a sectional detail showing a scraper in contact with its roll.

In general terms, the apparatus consists of grooved rolls arranged to co-act in pairs, one pair above another, in the same plane, each pair receiving material from the next pair above, and the lowest pair delivering the product to a conveyer, and the apparatus including driving, feeding, guiding, roll-cooling, product-dividing, and various adjusting devices.

In the several figures, 1 represents a suitable upright frame in which are mounted, one above the other in the same plane, five pairs of hollow, circumferentially grooved rolls 2, 3, connected by gears 18 to rotate with equal circumferential speed. All the rolls 3 have upon their shafts, respectively, equal gears 19, and these are driven by equal pinions 20, one of which is mounted on a main shaft 24 driven in this instance by a power pulley 25, while the others are mounted on parallel counter shafts 21 driven from said power shaft by sprocket wheels 22 and chain bolts 23. Each roll is provided with a series of circumferential V-shaped grooves 39 (Fig. 7) a little narrower than the space between them and the grooves of each roll being opposite the ungrooved spaces on the companion roll, as shown. At each end, beyond the grooves just mentioned, the rolls are turned down to form circumferential recesses 37, and beyond these are further turned down to form cylindrical bearing portions having at their inner ends shoulders 38. These bearing portions fit in bearing blocks 4 against which the shoulders abut and which are provided at their inner ends with circumferential recesses to co-act with the recesses 37 and prevent oil from passing to the grooved portions of the rolls. The blocks 4 for the two roll shafts are independently formed and mounted in the frame, one at least being slidable, with a block between them and are connected and drawn together by bolts 31 (Fig. 4). The rolls of each pair are in close contact so that practically no material, other than such as may lie in the grooves, can pass between them, and hence when they are once properly adjusted in contact the blocks are rarely moved laterally although obviously adjustment may be readily made. The bearings are further provided with lugs 35 and bolts 36 which secure them to the frame member 34 and permit slight endwise adjustments in the manner just mentioned.

In operation the rollers may become somewhat heated, and the heat being objectionable when certain materials are used I provide for water-cooling the rolls. To that end they are each provided with an internal cavity 40 (Fig. 6) to which water is supplied by a pipe 41 connected with a thimble 42 working in the end of the roll in a gland consisting of the threaded sleeve 43, packing 44 and lock-nut 45. The water entering through the thimble passes out through a smaller axial pipe 46 leading through a suitable fitting or coupling 48 to a discharge pipe 47. Parts of the pipe 41 and part of each pipe 46, near their entrance at 49 to the pipe 47, are flexible so that adjustments or other slight movements of the rolls require no adjustment of the pipes.

The material or stock is placed in a hopper 7, above the upper rolls, whence it falls through a preferably flexible spout 8 into second hopper 9 closely fitting upon the upper rolls and having ends 17 adjustable toward and from the middle of the rolls to vary the length of the hopper and effective length of the rolls, thereby controlling the amount of material which passes through the first set of rolls, and which should vary with varying materials. The sides 50 of the hopper (Fig. 3) are fixed to the frame and its ends are carried upon right threaded and left threaded portions of a screw 51 mounted in the frame and rotated by a chain bolt 53 passing over a sprocket wheel 52 upon the shaft 51 and a sprocket wheel 54, the adjusting power being applied by the operator.

As the material falls from each set of rolls to the next, it is guided to the middle portion of the rolls by oppositely faced converging spouts 5 and is spread along the rolls by a bar 15 fixed to a horizontal reciprocating rod 16 (Fig. 3) connected by a link 26 to an arm 27 projecting from a vertical shaft 28 which is rocked back and forth by the shaft of the roller 3 acting through a crank 32, pitman 37, and link 30 pivotally connected to an arm 29 projecting from the rock-shaft. The material thus distributed along the rolls is prevented from falling from their ends by fenders or plates 14, supported from the frame a little beyond the path of the agitating or spreading bar. As the spouts 5 need frequent cleaning, they are fixed in place by clips 56 secured to the frame by thumb-screws 57 and are thus readily removed and replaced. Any material that may adhere to any of the rolls is removed by one of several scrapers 10 fixed to arms 11 pivoted at 12 to the frame and adjusted by thumb screws 13.

Below the lower rolls are fixed parallel dividing blades or partitions 59 laterally grooved at the bottom so that they may overhang the edges of parallel conveyer belts 6 and at their upper sides having sharp knife edges to fit around the lower sides of the rolls. The material is thus divided part falling on each belt, and owing to its being compelled to adjust itself at a little distance from the edges of the belts it is practically prevented from afterward falling therefrom.

What I claim:

1. In apparatus of the class described, the combination with a pair of shredding rolls, of a second pair of shredding rolls delivering shreds, in the bight of the first pair, and means for arranging, delivered shreds across the grooves of the rolls first mentioned.

2. In a machine of the class described, the combination with pairs of co-acting shredding rolls mounted one pair above another in the same plane and one roll of each pair having circumferential grooves spanned by ungrooved portions of its companion, of a hopper above the first pair, spouts for directing shreds from each pair to the succeeding pair, and agitator arms arranged to move back and forth longitudinally above each pair of rolls below the first to distribute the shreds across the grooves.

3. The combination with a series of pairs of co-acting shredding rolls, a feeding hopper, and a receiving hopper, all mounted one above the other approximately in the same vertical plane, of a reciprocating distributing device moving above the central portion of the bight of the upper rolls, and means for limiting the distribution to a predetermined central portion of the rolls.

4. In a cereal shredding machine, the combination with parallel pairs of shredding rolls, one pair above another, of a hopper above the first pair and delivering thereto, spouts for guiding the shreds from each pair to the central portion of the next lower pair, agitators arranged to move back and forth from end to end of the effective portion of the rolls which receive shreds, and adjustable fenders near the ends, respectively of the path of each agitator.

5. In a machine of the class described, the combination with a series of sets of rolls mounted above one another, of agitators, for the different sets, respectively, a shaft extending along the different sets and actuating all of them, and a crank mounted above the axis of one set and arranged to drive the agitator shaft, substantially as shown.

6. In a machine of the class described, a combination with a series of sets of grooved rolls mounted above one another, whereby the material of one set passes to the next set, of a hopper for delivering the material to the first set, converging spouts for directing the material from one set to the other set, whereby there may be an accumulation of material at each set of rolls, longitudinally moving devices above each set for intermingling the material before it passes through and is drawn out by the rolls, and fenders limiting the displacement by said devices substantially as shown and described.

7. In a cereal shredding machine, the combination of pairs of shredding rollers one pair above another in the same plane, a hopper delivering material to be shredded to the first pair of rolls, two part converging spouts for massing the shreds received from above and delivering them to the central portion of the succeeding pair of rolls, and an arm arranged to reciprocate along the rolls between the parts of the spout, intermingling the shreds and distributing them across the grooves of the rollers.

8. In a machine of the class described, the combination with grooved rolls arranged to receive stock above, convert it into shreds or filaments, and deliver it below, and sharp edged partitions arranged to separate the product into distinct lots as it leaves the lower rolls.

9. In a machine of the class described, the combination with grooved rolls arranged to form and deliver sheets or filaments of material, of parallel knife-edged dividing partitions fitting against the delivery side of the rolls, and a conveyer belt parallel to said partitions and having its lateral margins extending under the lower sides of the same, substantially as set forth.

In testimony whereof I affix my signature in presence of two witnesses.

WILLIAM E. WILLIAMS.

Witnesses:
R. ROPER,
H. CROON.